(12) United States Patent
Kim et al.

(10) Patent No.: US 11,568,303 B2
(45) Date of Patent: Jan. 31, 2023

(54) ELECTRONIC APPARATUS AND CONTROL METHOD THEREOF

(71) Applicant: SAMSUNG ELECTRONICS CO., LTD., Suwon-si (KR)

(72) Inventors: Kyoung-hoon Kim, Suwon-si (KR); Young-hwan Park, Yongin-si (KR); Dong-soo Lee, Seongnam-si (KR); Dae-hyun Kim, Seoul (KR); Han-su Cho, Suwon-si (KR); Hyun-jung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 514 days.

(21) Appl. No.: 16/153,135

(22) Filed: Oct. 5, 2018

(65) Prior Publication Data
US 2019/0311302 A1 Oct. 10, 2019

(30) Foreign Application Priority Data
Apr. 10, 2018 (KR) .......................... 10-2018-0041533

(51) Int. Cl.
*G06N 20/00* (2019.01)
(52) U.S. Cl.
CPC .................... *G06N 20/00* (2019.01)
(58) Field of Classification Search
CPC G06N 20/00; G06N 3/04; G06N 3/00; G06N 5/00; G06N 7/00; G06N 10/00; G06N 99/00
See application file for complete search history.

(56) References Cited

U.S. PATENT DOCUMENTS 5,911,002 A * 6/1999 Mitsuyama .......... G01N 33/493
382/156
9,263,036 B1 2/2016 Graves
(Continued)

FOREIGN PATENT DOCUMENTS

JP 2006-201265 A 8/2006
JP 2012-252368 A 12/2012
(Continued)

OTHER PUBLICATIONS

J. Albericio et al., "Bit-Pragmatic Deep Neural Network Computing," 2017 50th Annual IEEE/ACM International Symposium on Microarchitecture (MICRO), Boston, MA, USA, 2017, pp. 382-394. (Year: 2017).*

(Continued)

*Primary Examiner* — Kakali Chaki
*Assistant Examiner* — Johnathan R Germick
(74) *Attorney, Agent, or Firm* — Sughrue Mion, PLLC

(57) ABSTRACT

An electronic apparatus is provided. The electronic apparatus includes a first memory configured to store a first artificial intelligence (AI) model including a plurality of first elements and a processor configured to include a second memory. The second memory is configured to store a second AI model including a plurality of second elements. The processor is configured to acquire output data from input data based on the second AI model. The first AI model is trained through an AI algorithm. Each of the plurality of second elements includes at least one higher bit of a plurality of bits included in a respective one of the plurality of first elements.

14 Claims, 20 Drawing Sheets

(56) References Cited

U.S. PATENT DOCUMENTS

| | | | |
|---|---|---|---|
| 9,275,734 | B2 | 3/2016 | Inoue |
| 9,508,340 | B2 | 11/2016 | Parada San Martin et al. |
| 9,620,108 | B2 | 4/2017 | Sak |
| 9,721,562 | B2 | 8/2017 | Sak |
| 9,728,185 | B2 | 8/2017 | Schalkwyk et al. |
| 9,747,083 | B1 | 8/2017 | Roman et al. |
| 9,786,270 | B2 | 10/2017 | Senior et al. |
| 9,818,410 | B2 | 11/2017 | Sak |
| 2012/0324204 | A1 | 12/2012 | Inoue |
| 2014/0337274 | A1 | 11/2014 | Unnikrishnan |
| 2016/0035344 | A1 | 2/2016 | Gonzalez-Dominguez et al. |
| 2016/0275146 | A1 | 9/2016 | Shu |
| 2016/0350074 | A1 | 12/2016 | Choi et al. |
| 2016/0350655 | A1 | 12/2016 | Weiss et al. |
| 2016/0351188 | A1 | 12/2016 | Rao et al. |
| 2017/0031330 | A1 | 2/2017 | Shiraishi et al. |
| 2017/0076196 | A1 | 3/2017 | Sainath et al. |
| 2017/0125020 | A1 | 5/2017 | Seo et al. |
| 2019/0171420 | A1* | 6/2019 | Malaya ............... G06N 3/063 |

FOREIGN PATENT DOCUMENTS

| | | |
|---|---|---|
| KR | 10-2012-0040649 A | 4/2012 |
| KR | 10-2017-0050029 A | 5/2017 |

OTHER PUBLICATIONS

Surat Teerapittayanon and Bradley McDanel and H. T. Kung (2017). BranchyNet: Fast Inference via Early Exiting from Deep Neural NetworksCoRR, abs/1709.01686. (Year: 2017).*

Hokchhay Tann and Soheil Hashemi and Sherief Reda (2018). Flexible Deep Neural Network ProcessingCoRR, abs/1801.07353. (Year: 2018).*

Y. Lin, C. Sakr, Y. Kim and N. Shanbhag, "PredictiveNet: An energy-efficient convolutional neural network via zero prediction," 2017 IEEE International Symposium on Circuits and Systems (ISCAS), Baltimore, MD, 2017, pp. 1-4, doi: 10.1109/ISCAS.2017. 8050797. (Year: 2017).*

K. Bong, S. Choi, C. Kim, D. Han and H. Yoo, "A Low-Power Convolutional Neural Network Face Recognition Processor and a CIS Integrated With Always-on Face Detector," in IEEE Journal of Solid-State Circuits, vol. 53, No. 1, pp. 115-123, Jan. 2018, doi: 10.1109/JSSC.2017.2767705. (Year: 2018).*

Ji, Ovsiannikov. "Reducing Weight Precision of Convolutional Neural Networks Towards Large-Scale on-Chip Image Recognition." Reducing weight precision of Convolutional neural networks towards large-scale on-Chip image recognition. vol. 9496. SPIE, 2015. 94960A-94960A-9. Web. (Year: 2015).*

Leroux, Sam & Bohez, Steven & Verbelen, Tim & Vankeirsbilck, Bert & Simoens, Pieter & Dhoedt, Bart. (2015). Resource-constrained classification using a cascade of neural network layers. 10.1109/IJCNN.2015.7280601. (Year: 2015).*

Liu Y, Yao X. Ensemble learning via negative correlation. Neural Netw. Dec. 1999;12(10):1399-1404. doi: 10.1016/s0893-6080(99) 00073-8. PMID: 12662623. (Year: 1999).*

Soheil Hashemi, Nicholas Anthony, Hokchhay Tann, R. Iris Bahar, & Sherief Reda (2016). Understanding the Impact of Precision Quantization on the Accuracy and Energy of Neural Networks. CoRR, abs/1612.03940. p. 1-6 (Year: 2016).*

E. Park et al., "Big/little deep neural network for ultra low power inference," 2015 International Conference on Hardware/Software Codesign and System Synthesis (CODES+ISSS), 2015, pp. 124-132, doi: 10.1109/CODESISSS.2015.7331375. (Year: 2015).*

Han et al., "ESE: Efficient Speech Recognition Engine with Sparse LSTM on FPGA", Feb. 22-24, 2017, arXiv:1612.00694v2 [cs.CL], 10 pages total.

Guan et al., "FPGA-based Accelerator for Long Short-Term Memory Recurrent Neural Networks", National Natural Science Foundation of China, 6 pages total.

Li, et al., "FPGA Acceleration of Recurrent Neural Network based Language Model", NSF, 8 pages total.

Chung et al., "Empirical Evaluation of Gated Recurrent Neural Networks on Sequence Modeling", Dec. 11, 2014, arXiv:1412. 3555v1 [cs.NE], 9 pages total.

Wang, et al., "Accelerating Recurrent Neural Networks: A Memory-Efficient Approach", Oct. 2017, IEEE Transactions on Very Large Scale Integration (VLSI) Systems, vol. 25, Issue 10, pp. 2763-2775.

Chang, et al., "Hardware accelerators for Recurrent Neural Networks on FPGA", 2017, IEEE, 4 pages total.

International Search Report (PCT/ISA/210) dated Mar. 6, 2019 issued by the International Searching Authority in International Application No. PCT/KR2018/014374.

Written Opinion (PCT/ISA/237) dated Mar. 6, 2019 issued by the International Searching Authority in International Application No. PCT/KR2018/014374.

Guan et al., "FPGA-based Accelerator for Long Short-Term Memory Recurrent Neural Networks", Jan. 16-19, 2017, National Natural Science Foundation of China, 6 pages total.

Li, et al., "FPGA Acceleration of Recurrent Neural Network based Language Model", May 2-6, 2015, NSF, 8 pages total.

Vivienne Sze et al., "Efficient Processing of Deep Neural Networks: A Tutorial and Survey", arxiv.org, Mar. 27, 2017, 31 pages total, XP080759895.

Swagath Venkataramani et al., "Quality Programmable Vector Processors for Approximate Computing", MICROARCHITECTURE, Dec. 7, 2013, 12 pages total, XP058036229.

Patrick Judd et al., "Stripes: Bit-Serial Deep Neural Network Computing", MICROARCHITECTURE, IEEE Press, Oct. 15, 2016, 12 pages total, XP058384775.

Sayeh Sharify et al., "Loom: Exploiting Weight and Activation Precisions to Accelerate Convolutional Neural Networks", arxiv. org, Jun. 23, 2017, 8 pages total, XP081315128.

Bert Moons et al., "14.5 Envision: A 0.26-to-10TOPS/W Subword-Parallel Dynamic-Voltage-Accuracy-Frequency-Scalable Convolutional Neural Network Processor in 28nm FDSOI", ISSCC 2017, Session 14, Deep-Learning Processors, IEEE, Feb. 2017, pp. 246-247, 3 pages total, XP033073577.

Communication dated Jan. 19, 2021 issued by the European Intellectual Property Office in counterpart European Application No. 18914851.3.

* cited by examiner

FIG. 2A $$\begin{bmatrix} 11001 & 10110 & 01001 & \cdots & 10111 \\ \vdots & & \ddots & & \vdots \\ 01001 & & \cdots & & 00010 \end{bmatrix}$$

FIG. 2B $$\begin{bmatrix} 110 & 101 & 010 & \cdots & 101 \\ \vdots & & \ddots & & \vdots \\ 010 & & \cdots & & 000 \end{bmatrix}$$

$$A \begin{bmatrix} 1 & 1 & 0 & \cdots & 1 \\ \vdots & & \ddots & & \vdots \\ 0 & & \cdots & & 0 \end{bmatrix} \quad B \begin{bmatrix} 10 & 01 & 10 & \cdots & 01 \\ \vdots & & \ddots & & \vdots \\ 10 & & \cdots & & 00 \end{bmatrix}$$

FIG. 3

$$\begin{bmatrix} 101 \\ 111 \\ 101 \\ \vdots \\ 000 \end{bmatrix}$$

FIG. 4A $$A \begin{bmatrix} 1 & 1 & 0 & \cdots & 1 \\ \vdots & & \ddots & & \vdots \\ \vdots & & & \ddots & \vdots \\ 0 & & \cdots & & 0 \end{bmatrix} \cdot \begin{bmatrix} 101 \\ 111 \\ 101 \\ \vdots \\ 000 \end{bmatrix} = \begin{bmatrix} \text{out 1} \\ \text{out 2} \\ \text{out 3} \\ \vdots \\ \text{out n} \end{bmatrix}$$

FIG. 4B $$B \begin{bmatrix} 10 & 01 & 10 & \cdots & 01 \\ \vdots & & \ddots & & \vdots \\ 10 & & \cdots & & 00 \end{bmatrix} \cdot \begin{bmatrix} 101 \\ 111 \\ 101 \\ \vdots \\ 000 \end{bmatrix} = \begin{bmatrix} out'\ 1 \\ out'\ 2 \\ out'\ 3 \\ \vdots \\ out'\ n \end{bmatrix}$$

FIG. 6

$$\begin{bmatrix} 01 & 10 & 01 & \cdots & 11 \\ \vdots & & \ddots & & \vdots \\ 01 & & \cdots & & 10 \end{bmatrix} \cdot \begin{bmatrix} 101 \\ 111 \\ 101 \\ \vdots \\ 000 \end{bmatrix} = \begin{bmatrix} \text{out''}\ 1 \\ \text{out''}\ 2 \\ \text{out''}\ 3 \\ \vdots \\ \text{out''}\ n \end{bmatrix}$$

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2018-0041533, filed on Apr. 10, 2018, in the Korean Intellectual Property Office, the disclosure of which is incorporated by reference herein in its entirety.

BACKGROUND

1. Field

The disclosure relates to an electronic apparatus and a control method thereof, and more particularly, to an electronic apparatus for applying input data to an artificial intelligence (AI) model, and a control method thereof.

2. Description of Related Art

An artificial intelligence (AI) system which realizes a human-level intelligence has been recently used in various fields. The AI system refers to a system where a machine learns, determines, and becomes intelligent by itself differently from an existing rule-based smart system. As used, the AI system has increasingly improved a recognition rate thereof and has more accurately understood a user's taste or preference. Therefore, the existing rule-based smart system has been gradually replaced with a deep learning-based AI system.

An AI technology includes machine learning (e.g., deep learning) and element technologies using the machine learning.

The machine learning is an algorithm technology for classifying and/or learning characteristics of pieces of input data by itself. The element technology is a technology which copies functions of a recognition, a determination, and the like of a human brain by using a machine learning algorithm of deep learning or the like and includes technical fields such as a verbal comprehension, a visual comprehension, inference and/or prediction, a knowledge representation, an operation control, and the like.

Various fields to which the AI technology is applied are as follows. The verbal comprehension is a technology which recognizes and applies and/or processes a language and/or letters of a human language and includes natural language processing, a machine translation, a conversation system, questions and answers, voice recognition and/or synthesis, and the like. The visual comprehension is a technology which recognizes and processes elements such as vision of a human and includes object recognition, an object tracking, an image search, a human recognition, a scene comprehension, a space comprehension, an image improvement, and the like. The inference and/or prediction is a technology which determines information and logically infers and predicts the information and which includes a knowledge and/or probability-based inference, an optimization prediction, a preference-based plan, a recommendation, and the like. The knowledge representation is a technology which automatically processes experience information of a human as knowledge data and includes a knowledge construction (data generation and/or classification), a knowledge management (data application), and the like. The operation control is a technology which controls autonomous driving of a vehicle and motions of a robot and includes a motion control (navigation, collision, driving), a manipulation control (behavior control), and the like.

For example, the AI system may be used for generating an AI model for voice recognition. In particular, AI system for the voice recognition has been evaluated as an appropriate model for learning data changing with the flow of time like time series data in case of a Recurrent Neural Network (RNN).

However, an RNN-trained AI model includes a larger amount of learned data than a Convolutional Neural Network (CNN)-trained AI model or the like and thus includes a large amount of data which is to be brought from an external source such as a Dynamic Random Access Memory (DRAM) or the like, thereby increasing arithmetic delay and energy consumption caused by a data transfer.

The above information is presented as background information only to assist with an understanding of the present disclosure. No determination has been made, and no assertion is made, as to whether any of the above might be applicable as prior art with regard to the present disclosure.

SUMMARY

Provided are an electronic apparatus for minimizing a data transmission with a processor and an external memory installed outside the processor, and a control method thereof.

According to an aspect of the disclosure, an electronic apparatus includes a first memory configured to store a first artificial intelligence (AI) model including a plurality of first elements, and a processor which includes a second memory which is configured to store a second AI model including a plurality of second elements. The processor is configured to acquire output data from input data based on the second AI model. The first AI model is trained through an AI algorithm. Each of the plurality of second elements includes at least one higher bit of a plurality of bits included in a respective first element from among the plurality of first elements.

The processor may acquire a plurality of first output elements by applying the input data to the second AI model and acquire one of the plurality of first output elements as the output data based on sizes of the plurality of first output elements.

Based on a difference between the first output element having a first largest size and the first output element having a second largest size, being larger than or equal to a preset size, the processor may acquire the first output element having the first largest size as the output data.

The second memory may store a third AI model including a plurality of third elements. Based on the difference between the first output elements, being smaller than the preset size, the second memory stores the plurality of first output elements and the processor acquires a plurality of first middle elements by applying the input data to the third AI model, acquires a plurality of second output elements based on the first output elements and the first middle elements, and acquires one of the plurality of second output elements as the output data based on sizes of the plurality of second output elements. Each of the plurality of third elements includes at least one higher bit of a plurality of bits included in each of the plurality of first elements except for at least one bit included in each of the plurality of second elements.

Based on a difference between the second output element having a first largest size and the second output element having a second largest size among the plurality of second output elements, being larger than or equal to the preset size, the processor may acquire the second output element having the first largest size as the output data.

Based on the difference between the second output elements, being smaller than the preset size, the second memory may store the plurality of second output elements and the processor may acquire others of the plurality of first elements, excluding the plurality of second elements and the plurality of third elements, from the first memory, acquire a plurality of second middle elements by performing an arithmetic operation on the acquired other first elements and the input data, acquire a plurality of third output elements based on the second output elements and the second middle elements, and acquire the third output element having a largest size among the plurality of third output elements as the output data.

The processor may acquire one of the plurality of second output elements as the output data based on at least one selected from among a size, a gradient, a moving average, and softmax of each of the plurality of second output elements.

The processor may include at least one multiplier configured to apply the input data to the second AI model.

The at least one multiplier may include a shifter configured to receive one of a plurality of elements included in the input data, shift, and output the received element according to a cycle, a First-In First-Out (FIFO) memory configured to receive the second element of the plurality of second elements corresponding to the element input into the shift and output at least one bit included in the received second element according to the cycle, and an accumulator configured to receive and accumulate a result of an arithmetic operation performed on the element output from the shifter and the second element output from the FIFO memory according to the cycle.

According to another aspect of the disclosure, a method of controlling an electronic apparatus having a first memory and a processor, is provided. The method includes storing a first AI model including a plurality of first elements in the first memory, storing a second AI model including a plurality of second elements in a second memory of the processor, and acquiring output data from input data based on the second AI model. The first AI model is trained through an AI algorithm, and each of the plurality of second elements includes at least one higher bit of a plurality of bits comprised in a respective one from among the plurality of first elements.

The acquiring may include acquiring a plurality of first output elements by applying the input data to the second AI model, and acquiring one of the plurality of first output elements as the output data based on sizes of the plurality of first output elements.

The acquiring the one of the plurality of first output elements as the output data may include, based on a difference between the first output element having a first largest size and the first output element having a second largest size among the plurality of first output elements, being larger than or equal to a preset size, acquiring the first output element having the first largest size as the output data.

The method may further include storing a third AI model including a plurality of third elements in the second memory, based on the difference between the first output elements, being smaller than the preset size, storing the plurality of first output elements in the second memory, acquiring a plurality of first middle elements by applying the input data to the third AI model, acquiring a plurality of second output elements based on the first output elements and the first middle elements, and acquiring one of the plurality of second output elements as the output data based on sizes of the plurality of second output elements. Each of the plurality of third elements includes at least one higher bit of a plurality of bits included in a respective one from among the plurality of first elements, except for at least one bit included in each of the plurality of second elements.

The acquiring of the one of the plurality of second output elements as the output data may include, based on a difference between the second output element having a first largest size and the second output element having a second largest size among the plurality of second output elements, being larger than or equal to the preset size, acquiring the second output element having the first largest size as the output data.

The method may further include, based on the difference between the second output elements, being smaller than the preset size, storing the plurality of second output elements in the second memory, acquiring others of the plurality of first elements, excluding the plurality of second elements and the plurality of third elements, from the first memory, acquiring a plurality of second middle elements by performing an arithmetic operation on the acquired other first elements and the input data, acquiring a plurality of third output elements based on the second output elements and the second middle elements, and acquiring the third output element having a first largest size among the plurality of third output elements as the output data.

The acquiring of the one of the plurality of second output elements as the output data may include acquiring the one of the plurality of second output elements as the output data based on at least one selected from among a size, a gradient, a moving average, and softmax of each of the plurality of second output elements.

The acquiring may include applying the input data to the second AI model through at least one multiplying operation.

According to another aspect of the disclosure, a non-transitory computer readable medium stores computer-readable instructions for performing an operation method of an electronic apparatus having a first memory and a processor. The operation method may include storing a first AI model including a plurality of first elements in the first memory, storing a second AI model including a plurality of second elements in a second memory of the processor, and acquiring output data from input data based on the second AI model. The first AI model is trained through an AI algorithm. Each of the plurality of second elements includes at least one higher bit of a plurality of bits included in a respective one from among the plurality of first elements.

According to an aspect of the disclosure, a processor of an electronic apparatus may improve energy efficiency by including an internal memory storing a compressed artificial intelligence (AI) model, improving an arithmetic speed by performing an arithmetic operation by using the compressed AI model, and minimizing a data transmission with an external memory storing an AI model.

Additional aspects will be set forth in part in the description which follows and, in part, will be apparent from the description, or may be learned by practice of the present embodiments.

BRIEF DESCRIPTION OF THE DRAWING FIGURES

The above and other aspects, features, and advantages of certain embodiments of the present disclosure will be more apparent from the following description taken in conjunction with the accompanying drawings, in which:

FIGS. 2A through 2D are views illustrating data which is stored in a first memory and a second memory, according to an embodiment;

FIG. 3 is a view illustrating input data, according to an embodiment;

FIGS. 4A and 4B are views illustrating a method of improving an accuracy of an arithmetic operation, according to an embodiment;

FIG. 6 is a view illustrating using a first artificial intelligence (AI) model, according to an embodiment;

DETAILED DESCRIPTION

Figure 1:
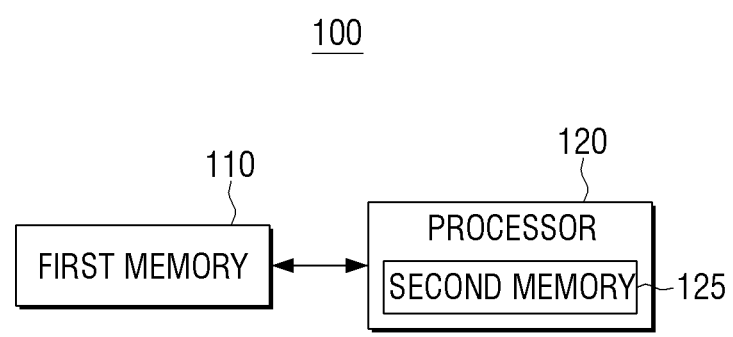
FIG. 1 is a block diagram illustrating a configuration of an electronic apparatus, according to an embodiment.

Embodiments of the present disclosure may be diversely modified. Accordingly, embodiments are illustrated in the drawings and are described in detail in the detailed description. However, it is to be understood that the present disclosure is not limited to an embodiment, but includes all modifications, equivalents, and substitutions without departing from the scope and spirit of the present disclosure. Also, well-known functions or constructions are not described in detail since they would obscure the disclosure with unnecessary detail.

Exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the embodiments may be carried out without those specifically defined matters. Also, well-known functions or constructions are not described in detail since they would obscure the disclosure with unnecessary detail.

Hereinafter, embodiments will be described in detail with reference to the attached drawings.

FIG. 1 is a block diagram illustrating a configuration of an electronic apparatus 100, according to an embodiment. As shown in FIG. 1, the electronic apparatus 100 includes a first memory 110 and a processor 120.

The electronic apparatus 100 may be an apparatus which acquires an output data of an input data based on an artificial intelligence (AI) model. For example, the electronic apparatus 100 may be a desktop personal computer (PC), a notebook computer, a smartphone, a tablet PC, a server, or the like. Alternatively, the electronic apparatus 100 may be a system where a cloud computing environment is constructed. However, the electronic apparatus 100 is not limited thereto and thus may be any apparatus capable of performing an arithmetic operation by using an AI model.

The first memory 110 may be included separately from the processor 120 and may be realized as a hard disk, a nonvolatile memory, a volatile memory, or the like.

The first memory 110 may store a first AI model. According to an embodiment, the first AI model may be trained through an AI algorithm.

For example, the first AI model may be a language model which is Recurrent Neural Network (RNN)-trained. Here, RNN refers to a recurrent neural network and is a type of deep learning model for learning data changing with a flow of time like time series data.

However, the first AI model is not limited thereto and may be a Convolutional Neural Network (CNN)-trained model. Alternatively, the first memory 110 may store a model which is generated based on a rule and not a model which is trained through the AI algorithm, and a model stored in the first memory 110 is not particularly limited. Hereinafter, for convenience of description, a first language model will be described as a RNN-trained language model.

The first language model, which is RNN-trained, may include a larger amount of data than a storage capacity of a second memory 125, which will be described in further detail below. Therefore, the first language model which is RNN-trained may be stored in the first memory 110 having a larger storage capacity than the second memory 125.

The first memory 110 may store the first AI model including a plurality of first elements. For example, the first AI model may be an m×n matrix form, and the plurality of first elements may be data which forms m×n matrixes. Also, the numbers of bits of the plurality of first elements may be the same.

The first memory 110 may provide data for the second memory 125 included in the processor 120 or may receive data from the second memory 125. For example, some data of the first AI model stored in the first memory 110 may be provided for the second memory 125.

The processor 120 controls an overall operation of the electronic apparatus 100.

The processor 120 may include the second memory 125. Here, the second memory 125 may be realized as a cache memory, a register file, a buffer, or the like, included in the processor 120.

The second memory 125 may have a smaller capacity than the first memory 110. Also, generated power consumption if data A, stored in the second memory 125, is transmitted to a processing element (PE) of the processor 120 may be smaller than generated power consumption if data A, stored in the first memory 110, is transmitted to the PE of the processor 120.

The second memory 125 may store a second AI model including a plurality of second elements. Here, the second AI model may include some of the data of the first AI model. However, a form of the second AI model may be the same as a form of the first AI model.

For example, if the first AI model is an m×n matrix form, the second AI model may also be an m×n matrix form. Also, if each of the plurality of first elements included in the first AI model is 10 bits, each of the plurality of second elements included in the second AI model may be smaller than 10 bits.

Each of the plurality of second elements may include at least one higher bit of a plurality of bits included in each of the plurality of first elements. For example, if a 1×1 element of the first AI model is 1110000000, a 1×1 element of the second AI model may be 111. If a 3×2 element of the first AI model is 0001111111, a 3×2 element of the second AI model may be 000. Also, the numbers of bits of the plurality of second elements may be the same.

Here, at least one higher bit may refer to the preset number of consecutive bits from a bit position having a highest value in binary data. In the above-described example, one higher bit may be 1, and two higher bits may be 11, three higher bits may be 111, and four higher bits may be 1110.

The first AI model and the second AI model are in m×n matrix forms, as described above but are not limited thereto. For example, the first AI model and the second AI mode may be respectively a first matrix form of m×n and a second matrix form of n×p and may have different forms according to the number of layers of an AI model in a learning process.

The processor 120 may acquire output data of input data based on the second AI model. Here, the input data may be data where a user voice formed of phoneme units is converted into a digital signal. However, the input data is not limited thereto and may vary with the first AI model. For example, if the first AI model is a model for image recognition, the input data may be an image. Here, a phoneme may be a unit of a sound which differentiates a meaning. Also, the input data may be units such as alphabet, words, syllables, or the like.

The output data may be a recognition result of a user voice of phoneme unit. For example, of the user voice is "good," a digital signal corresponding to "good" is provided for the processor 120 through a microphone. Here, the processor 120 may merely receive the digital signal and may not recognize that the received digital signal is "good." Thereafter, the processor 120 may acquire output data of the digital signal based on the second AI model. Here, the processor 120 may recognize that the output data is "good."

The processor 120 may acquire a plurality of first output elements by applying the input data to the second AI model and may acquire one of the plurality of first output elements as output data based on sizes of the plurality of first output elements.

For example, if a difference between the first output element having a first largest size and the first output element having a second largest size among the plurality of first output elements is larger than or equal to a preset size, the processor 120 may acquire the first output element having the first large size as the output data.

Also, the second memory 125 may store a third AI model including a plurality of third elements. Here, the third AI model may include merely some data of the first AI model. However, a form of the third AI model may be the same as a form of the first AI model.

For example, if the first AI model is an m×n matrix form, the third AI model may be an m×n matrix form. Also, if each of the plurality of first elements included in the first AI model is 10 bits, each of the plurality of third elements included in the third AI model may be smaller than 10 bits.

Each of the plurality of third elements may include at least one higher bit, excluding at least one bit included in each of the plurality of second elements from a plurality of bits included in each of the plurality of first elements.

For example, if a 1×1 element of the first AI model is 1110001111, and a 1×1 element of the second AI model is 111, a 1×1 element of the third AI model may be 000. If a 3×2 element of the first AI model is 0001010000, and a 3×2 element of the second AI model is 000, a 3×2 element of the third AI model may be 101. Also, the numbers of bits of the plurality of third elements may be the same.

If a difference between the first output elements is smaller than a preset size, the processor 120 may store a plurality of first output elements in the second memory 125, acquire a plurality of first middle elements by applying the input data to the third AI model, acquire a plurality of second output elements based on the first output elements and the first middle elements, and acquire one of the plurality of second output elements as the output data based on sizes of the plurality of second output elements.

The second AI model may have a lower accuracy than the first AI model, and the processor 120 may determine that an accuracy of the output data acquired by the second AI model is lower. In this case, the processor 120 may acquire the output data by using the third AI model having accuracy lower than the first AI model and more improved than the second AI model.

If a difference between the second output element having a first largest size and the second output element having a second largest size among the plurality of second output elements is larger than or equal to the preset size, the processor 120 may acquire the second output element having the first largest size as the output data.

If the difference between the second output elements is smaller than the preset size, the processor 120 may store the plurality of second output elements in the second memory 125, acquire others of the plurality of first elements, excluding the plurality of second elements and the plurality of third elements, from the first memory 110, acquire a plurality of second middle elements by performing an arithmetic operation on the acquired other first elements and the input data, acquire a plurality of third output elements based on the second output elements and the second middle elements, and acquire the third output element having a first largest size among the plurality of third output elements as the output data.

The third AI model may have a lower accuracy than the first AI model, and the processor 120 may determine that an accuracy of the output data acquired by the third AI model is low. In this case, the processor 120 may acquire the output data by using the first AI model.

Output data may be acquired or an additional arithmetic operation may be performed based on sizes of a plurality of output elements, as described above but are not limited thereto. For example, the processor 120 may acquire one of the plurality of second elements as the output data based on at least one selected from a size, a gradient, a moving average, and softmax of each of the plurality of second output elements.

The processor 120 may include at least one multiplier which applies the input data to the second AI model.

The at least one multiplier may include a shifter which receives one of a plurality of elements included in the input data, shifts and outputs the received element according to a cycle, a First-In First-Out (FIFO) memory which receives the second element corresponding to the element input into the shifter among the plurality of second elements and outputs at least one bit included in the received second element according to a cycle, and an accumulator which receives and accumulates a result of an arithmetic operation performed on the element output from the shifter and the second element output from the FIFO memory according to a cycle. This will be described in greater detail below.

The processor 120 may improve an arithmetic speed and energy efficiency through a method, as described above, according to an embodiment.

Hereinafter, according to an embodiment, an operation of the processor 120 will be described in more detail with reference to the drawings.

FIGS. 2A through 2D are views illustrating data which is stored in the first memory 110 and the second memory 125, according to an embodiment.

FIG. 2A is a view illustrating a first AI model stored in the first memory 110. The first AI model may be in an m×n matrix form. The first AI model may include m×n first elements, each of which may be 5 bits.

An upper portion of FIG. 2B illustrates an AI model stored in the second memory 125. The AI model stored in the second memory 125 may be in an m×n matrix form which is the same as the form of the first AI model. The AI model stored in the second memory 125 may include m×n elements, each of which may be 3 bits. Here, each element of 3 bits may be three higher bits of a corresponding first element.

As shown in a lower portion of FIG. 2B, the AI model stored in the second memory 125 may be classified into a second AI model and a third AI model. As shown on a left side A of the lower portion of FIG. 2B, the second AI model may include m×n second elements, each of which may be 1 bit. Here, each second element of 1 bit may be one higher bit of a corresponding element of 3 bits in the AI model stored in the second memory 125.

As shown on a right side B of the lower portion of FIG. 2B, the third AI model may include m×n third elements, each of which may be 2 bits. Here, each third element of 2 bits may be 2 bits of a corresponding third element except for the second element in the AI model stored in the second memory 125.

A first element is 5 bits, a second element is 1 bit, and a third element is 2 bits, as described above but is not limited thereto. In other words, if a sum of the number of bits of a second element and the number of bits of a third element is within the number of bits of a first element, the first, second, and third elements may be formed of the different numbers of bits.

The processor 120 may store some of a first AI model in the second memory 125 based on an accuracy of an arithmetic operation. For example, if an accuracy of 90% or more is secured with merely three higher bits of a plurality of first elements included in the first AI model, the processor 120 may store an AI model, which includes merely three higher bits of the plurality of first elements included in the first AI model, in the second memory 125. The accuracy of the arithmetic operation will be described in further detail below.

Alternatively, the processor 120 may store some of the first AI model in the second memory 125 based on a capacity of the second memory 125. For example, if the second memory 125 is capable of storing merely half of a capacity of the first AI model, the processor 120 may store an AI model, which includes merely half of higher bits of bits of the plurality of first elements included in the first AI model, in the second memory 125.

The processor 120 may acquire an AI model, which is to be stored in the second memory 125, from the first AI model according to other various types of methods.

Figure 2C:
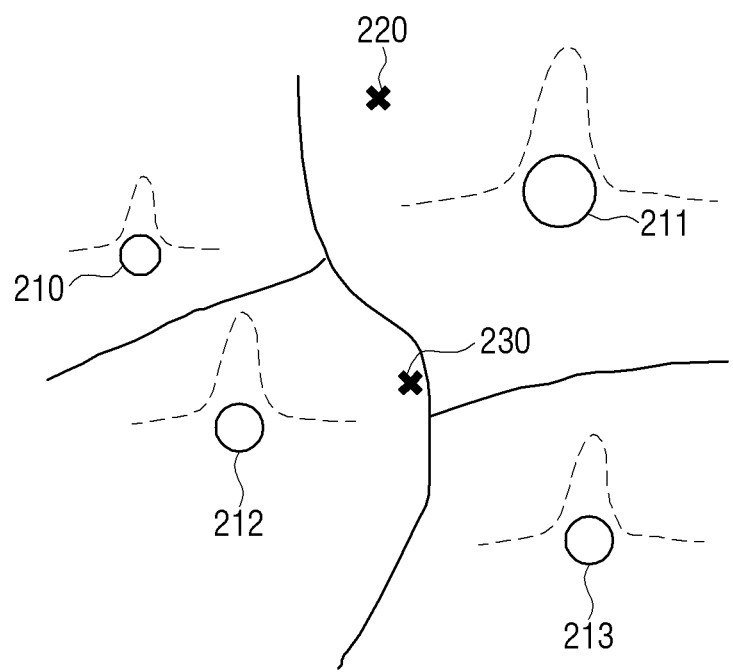
Figure 2D:
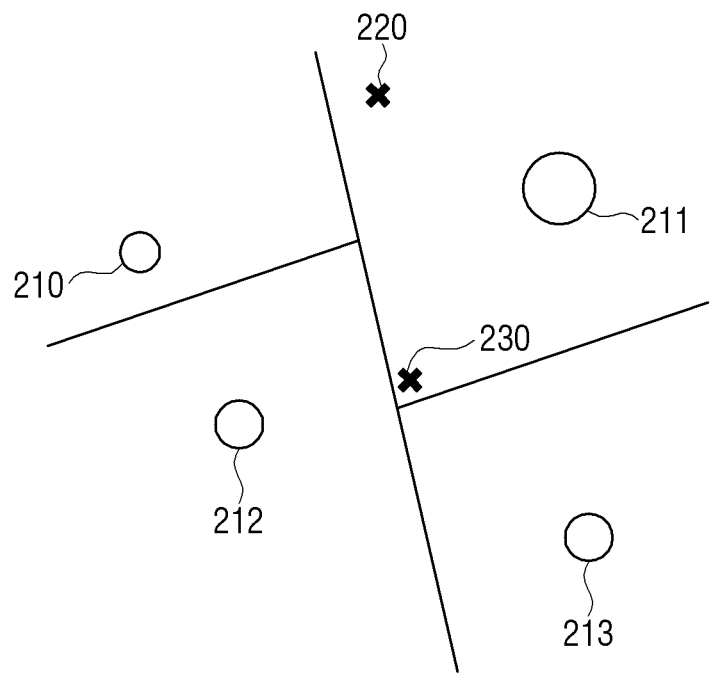

FIG. 2C is a view illustrating a phoneme classification hyperplane according to a first AI model, according to an embodiment. FIG. 2D is a view illustrating a phoneme classification hyperplane according to a second AI model, according to an embodiment.

Referring to FIG. 2C, the processor 120 may classify input data as one of first output data 210, second output data 211, third output data 212, and fourth output data 213 based on the first AI model. In other words, the processor 120 may map the input data on one point of a plane of FIG. 2C by applying the first AI model and acquire corresponding output data according to the mapped point.

For example, referring to FIG. 2C, the processor 120 may classify first input data 220 as the second output data 211 and second input data 230 as the third output data 212.

Also, referring to FIG. 2D, the processor 120 may classify input data as one of first output data 210, second output data 211, third output data 212, and fourth output data 213 based on a second AI model, but the input data may not be accurately classified on a hyperplane.

For example, referring to FIG. 2D, the processor 120 classifies first input data 220 as the second output data 211 but classifies second input data 230 as the second output data 211 and thus may deduce a result different from a result deduced with reference to FIG. 2C.

In other words, if the second AI model is used, merely some of the first AI model is included, thereby reducing an arithmetic operation amount and lowering a storage capacity. Also, since the second AI model is stored in the second memory 125 of the processor 120, an arithmetic speed of the processor 120 may be more improved than if the first AI model stored in the first memory 110, installed outside the processor 120, is used.

However, as shown in FIG. 2D, an accuracy of an arithmetic operation for some input data may be lowered. Hereinafter, a method of improving the accuracy of the arithmetic operation, according to an embodiment, will be described.

FIG. 3 is a view illustrating input data, according to an embodiment.

The input data may be in a form on which an arithmetic operation may be performed along with an AI model. For example, as shown in FIG. 3, if the AI model is in an m×n matrix form, the input data may be in an n×1 or 1×m matrix form. A plurality of elements included in the input data may be represented with a plurality of bits.

However, the input data may have any type of forms. Also, if a form of input data changes, training of the AI model may be performed based on the input data having the changing form, thereby changing a form of the AI model.

In other words, input data may have any form which is the same as that of input data which is used for training of the AI model.

FIGS. 4A and 4B are views illustrating a method of improving an accuracy of an arithmetic operation, according to an embodiment.

As shown in FIG. 4A, the processor 120 may acquire a plurality of first output elements "out 1 through out n" by performing an arithmetic operation on a second AI model and input data. If a difference between a first output element having a first largest size and a first output element having a second largest size among the plurality of first output elements "out 1 through out n" is larger than or equal to a preset size, the processor 120 may acquire the first output element having the first largest size as output data.

Alternatively, the difference between the first output element having the first largest size and the first output element having the second largest size among the plurality of first output elements "out 1 through out n" may be smaller than the preset size. In this case, the processor 120 may store the plurality of first output elements "out 1 through out n" in the second memory 125.

Also, as shown in FIG. 4B, the processor 120 may acquire a plurality of first middle elements "out' 1 through out' n" by performing an arithmetic operation on third AI model B and input data.

The processor 120 may acquire a plurality of second output elements based on the plurality of first output elements "out 1 through out n" and the plurality of first middle elements "out' 1 through out' n". Here, the processor 120 may acquire a plurality of second output elements from the plurality of first output elements "out 1 through out n" and the plurality of first middle elements "out' 1 through out' n" based on a relative digit number of bits which are included in the second AI model and the third AI model and positioned in the first AI model.

For example, if each of a plurality of first elements included in the first AI model is 3 bits, each of a plurality of second elements included in the second AI model is higher 1 bit of the corresponding first element of 3 bits, and each of a plurality of third elements included in the third AI model is middle 1 bit of the corresponding first element of 3 bits, the processor 120 may move a position of each of the plurality of first output elements "out 1 through out n" by 1 bit and then perform an add operation on the plurality of first output elements "out 1 through out n" and the plurality of first middle elements "out' 1 through out' n". For example, the processor 120 may acquire one of the plurality of second output elements by performing "out 1×2+out' 1" and acquire the plurality of second output elements by equally performing an arithmetic operation on the others.

The processor 120 may acquire one of the plurality of second output elements as output data based on sizes of the plurality of second output elements. Also, a method of acquiring the one of the plurality of second output elements as the output data is the same as a method of acquiring the one of the plurality of first output elements as the output data, and thus a detailed description thereof is omitted herein for simplicity.

The processor 120 may store a result of a previous arithmetic operation in the second memory 125 and perform an additional arithmetic operation by using the third AI model except for bits included in the second AI model which are used in the previous arithmetic operation, thereby improving an arithmetic speed.

In the above description of an embodiment, output data is acquired by using a difference between an output element having a first largest size and an output element having a second largest size among output elements, but different types of methods may be used. In particular, the processor 120 may use a plurality of language models and, in this case, may check an accuracy of an arithmetic operation according to more various methods. This will be described with reference to FIGS. 5A and 5B, according to an embodiment.

Figure 5A:
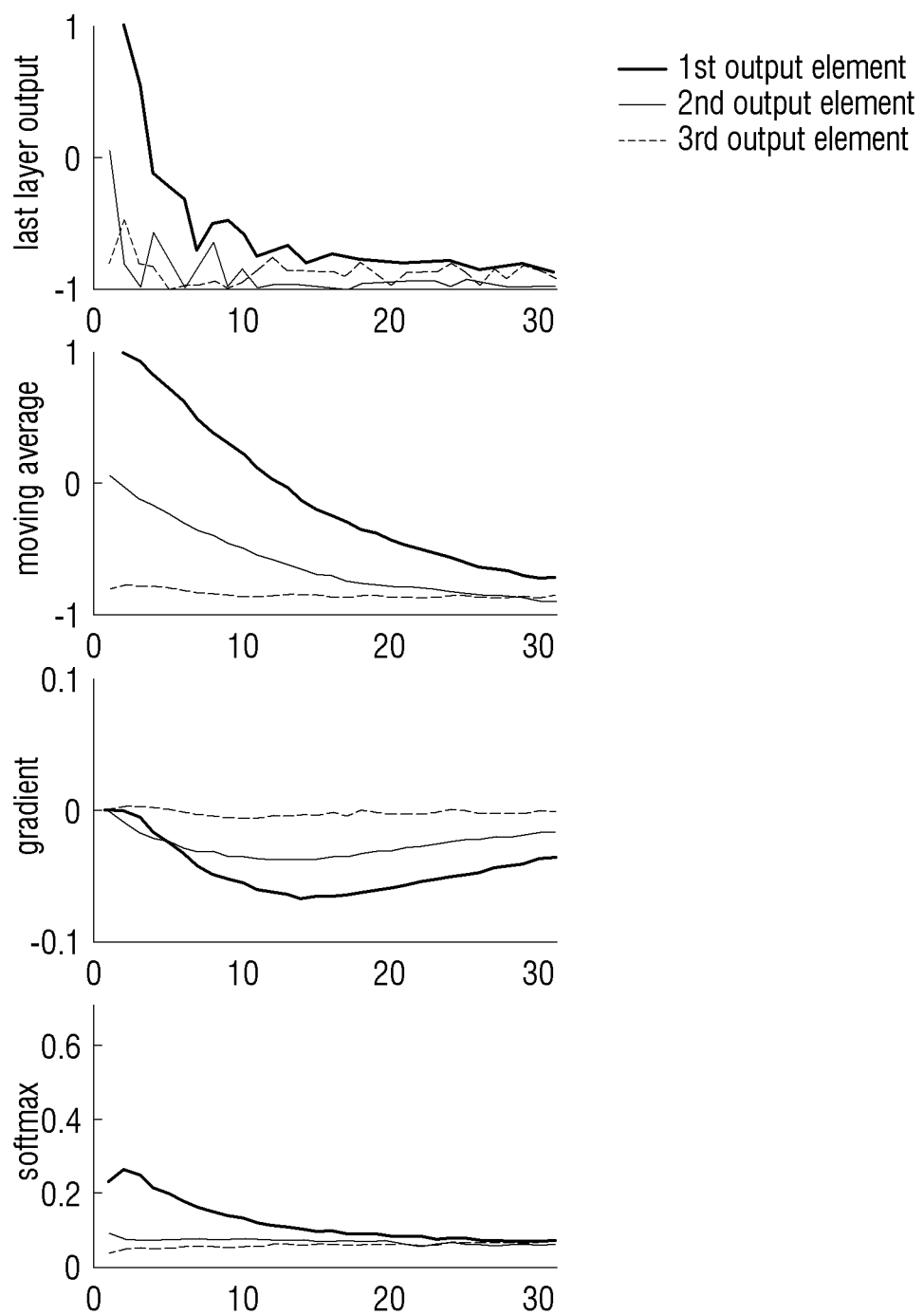
FIGS. 5A and 5B are views illustrating a method of improving an accuracy of an arithmetic operation, according to another embodiment.
Figure 5B:
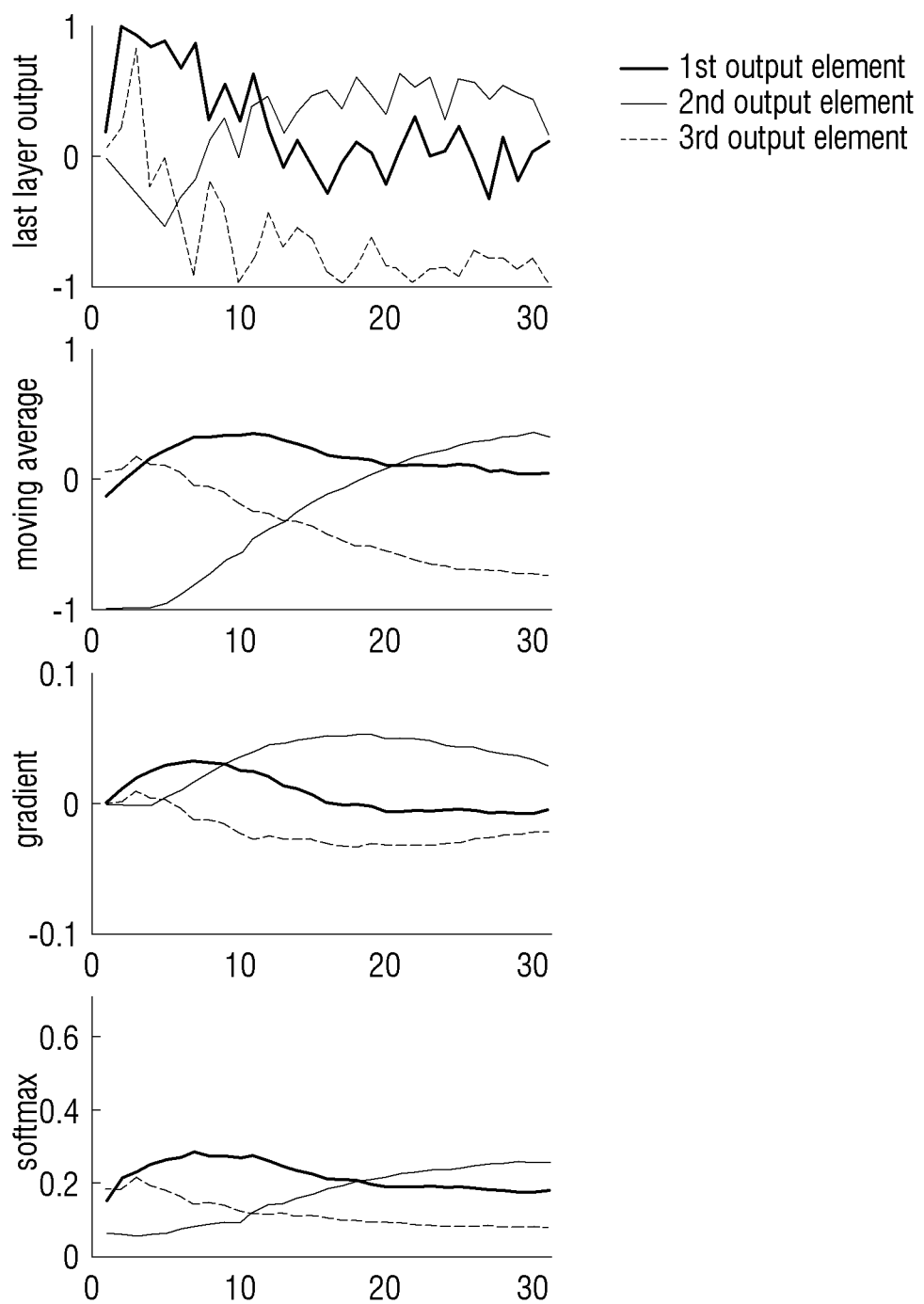

FIGS. 5A and 5B are views illustrating a method of improving an accuracy of an arithmetic operation according to another embodiment.

X axes of FIGS. 5A and 5B denote the number of higher bits used in a plurality of first elements included in a first AI model for performing an arithmetic operation on input data. For example, X axes of FIGS. 5A and 5B are 1, the X axes indicate that merely higher 1 bit is used in the plurality of first elements included in the first AI model. If the X axes of FIGS. 5A and 5B are 2, the X axes indicate that merely higher 2 bits are used in the plurality of first elements included in the first AI model. Others are the same, and thus their repeated descriptions are omitted herein.

Y axes of FIGS. 5A and 5B denote a plurality of output elements and illustrate merely three of the plurality of output elements for convenience of description. The plurality of output elements may be more than or less than 3 and may be determined in training of an AI model.

As shown in FIGS. 5A and 5B, the processor 120 may acquire a size, a gradient, a moving average, and softmax of each of the plurality of output elements with respect to the number of bits of a plurality of elements included in an AI model used for an arithmetic operation. Also, the processor 120 may acquire one of the plurality of output elements as output data based on at least one selected from the size, the gradient, the moving average, and the softmax of each of the plurality of output elements.

In particular, tendencies of the plurality of output elements may be checked with an increase in the number of bits of the plurality of elements included in the AI model used for the arithmetic operation.

For example, as shown in FIG. 5A, if a difference between an output element having a first largest size and an output element having a second largest size is large when using an AI model including a plurality of elements of 1 bit, the processor 120 may determine that tendencies of the plurality of output elements will be maintained and acquire the output element having the first largest size as output data without an additional arithmetic operation.

As shown in FIG. 5B, if a difference between an output element having a first largest size and an output element having a second largest size is not large when using an AI model including a plurality of elements of 1 bit, the processor 120 may determine that tendencies of the plurality of output elements will not be maintained and may perform an additional arithmetic operation. Here, the processor 120 may use an AI model including a plurality of elements of 2 bits but may immediately use an AI model including a plurality of elements of 5 bits. If an output element having a second largest size becomes a first largest size with an increase in the number of bits of a plurality of elements included in an AI model, the processor 120 may acquire the output element of which size becomes the first largest size as output data. In FIG. 5B, the first artificial intelligence model different from the first artificial intelligence model used in FIG. 5A is used for convenience of explanation.

The processor 120 may store some of the first AI model, which is stored in the first memory 110, in the second memory 125. Also, the processor 120 may read merely some of data stored in the second memory 125 and perform an arithmetic operation on the some of the data.

For example, each of a plurality of first elements included in the first AI model may be 10 bits, and the processor 120 may store merely higher 5 bits of each of the plurality of first elements in the second memory 125. The processor 120 may form an AI model by reading higher 1 bit of data stored in the second memory 125 and acquire a plurality of output elements of input data from the formed AI model. Also, if an accuracy of an arithmetic operation is inaccurate, the processor 120 may form an AI model by reading second higher 1 bit of the data stored in the second memory 125, acquire a plurality of middle elements for the input data from the formed AI model, and acquire a plurality of output elements by using a plurality of output elements acquired through a previous arithmetic operation and the plurality of middle elements.

In other words, the second memory 125 may store merely some of the first AI model, stored in the first memory 110, and the processor 120 may acquire output data of input data as various types of AI models by reading merely some of data stored in the second memory 125.

FIG. 6 is a view illustrating using a first AI model according to an embodiment.

If tendencies as shown in FIGS. 5A and 5B are not checked by using an AI model stored in the second memory 125, the processor 120 may use a first AI model stored in the first memory 110.

Here, the processor 120 may store an arithmetic operation result in the second memory 125 by using an AI model stored in the second memory 125. The processor 120 may also acquire others of a plurality of first elements, excluding a plurality of second elements and a plurality of third elements, from the first memory 110. In other words, the processor 120 may acquire others, excluding an AI model stored in the second memory 125, from a first AI model stored in the first memory 110, from the first memory 110. An AI model shown in FIG. 6 may be the remaining bits excluding the AI model of FIG. 2B stored in the second AI model from the first AI model of FIG. 2A.

Also, the processor 120 may acquire a plurality of second middle elements (out" 1, out" 2, . . . , out" n) by performing an arithmetic operation on the acquired other first elements and the input data. The processor 120 may acquire a plurality of third output elements based on the plurality of second output elements and the plurality of second middle elements (out" 1, out" 2, . . . , out" n). A method of acquiring the plurality of third output elements is the same as the method of acquiring the plurality of second output elements, and thus a repeated description thereof is omitted herein.

The processor 120 may acquire the third output element having a first largest size among the plurality of third output elements as output data. Since all bits included in each of the plurality of first elements are used in FIG. 6, the processor 120 may not perform an additional arithmetic operation. In other words, the processor 120 may not perform the additional arithmetic operation after acquiring the plurality of third output elements. Therefore, the third output element having the first largest size among the plurality of third output elements may be the output data.

An arithmetic operation is performed by using other elements excluding an AI model stored in the second memory 125 from the first AI model, as described above with reference to FIG. 6 but is not limited thereto. For example, the processor 120 may form an AI model by reading merely higher 1 bit from other elements excluding the AI model stored in the second memory 125 from the first AI model and acquire a plurality of output elements of input data by using the formed AI model. In this case, the processor 120 may perform an additional arithmetic operation based on sizes of the plurality of output elements.

Figure 7:
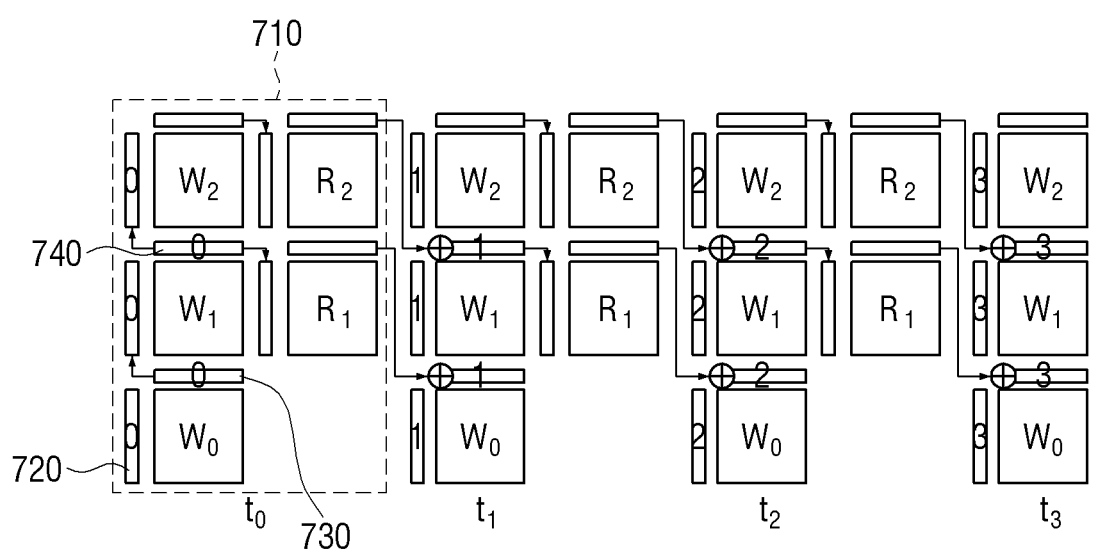
FIG. 7 is a view illustrating a Recurrent Neural Network (RNN) arithmetic operation, according to an embodiment.

FIG. 7 is a view illustrating an RNN arithmetic operation, according to an embodiment.

A first AI model is formed as one matrix as described above with reference to FIG. 2A, but this is for convenience of description only and is not limited thereto. The first AI model may include a plurality of matrixes.

For example, as shown in FIG. 7, the first AI model may include a matrix of W0, W1, W2, R1, and R2. Also, the processor 120 may acquire output data by repeating the same arithmetic operation by using a first layer 710 including the matrix of W0, W1, W2, R1, and R2. In other words, the first AI model may include a plurality of layers.

In addition, the processor 120 may acquire first output data 730 by inputting input data 720 into W0 and acquire second output data 740 by inputting first output data 730 into W1. The processor 120 may input the second output data 740 into W2 and R1. In other words, the processor 120 may use a middle arithmetic operation result as a plurality of inputs. The processor 120 may also store the middle arithmetic operation result in the second memory 125.

FIG. 7 is a view illustrating a first AI model, according to an embodiment, but the first AI model may be any other forms.

Figure 8A:
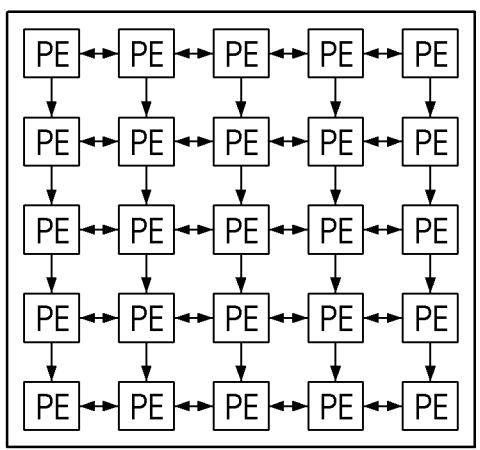
FIGS. 8A and 8B are views illustrating a multiplying operation, according to an embodiment.
Figure 8B:
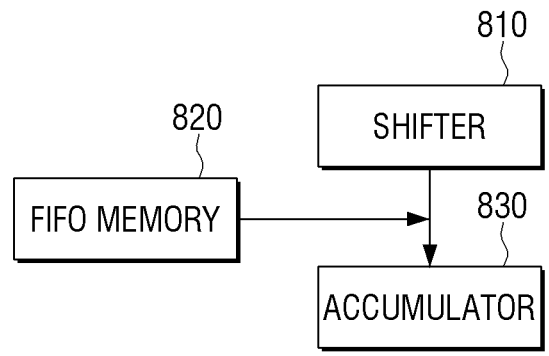

FIGS. 8A and 8B are views illustrating a multiplying operation, according to an embodiment.

As shown in FIG. 8A, the processor 120 may include a plurality of PEs. The plurality of PEs may be arrayed in a matrix, and each of the plurality of PEs may basically include a multiplier and an Arithmetic Logic Unit (ALU) which may include at least one or more adders. The PEs may perform four fundamental arithmetic operations by using the multiplier and the ALU. However, the PEs are not limited thereto and may be formed in other forms capable of functions of the four fundamental arithmetic operations, shifting, and the like.

As shown in FIG. 8B, at least one multiplier may include a shifter 810 which receives one of a plurality of elements included in input data, and shifts and outputs the received element according to a cycle, a FIFO memory 820 which receives a second element of a plurality of second elements corresponding to the element input into the shifter 810 and outputs at least one bit included in the received second element according to a cycle, and an accumulator 830 which receives and accumulates a result of an arithmetic operation performed on the element output from the shifter 810 and the second element output from the FIFO memory 820 according to a cycle.

In other words, if data output from the FIFO memory 820 is 0, 0 may be input into the accumulator 830. If the data output from the FIFO memory 820 is 1, data output through the shifter 810 may be input into and accumulated in the accumulator 830.

Figure 9A:
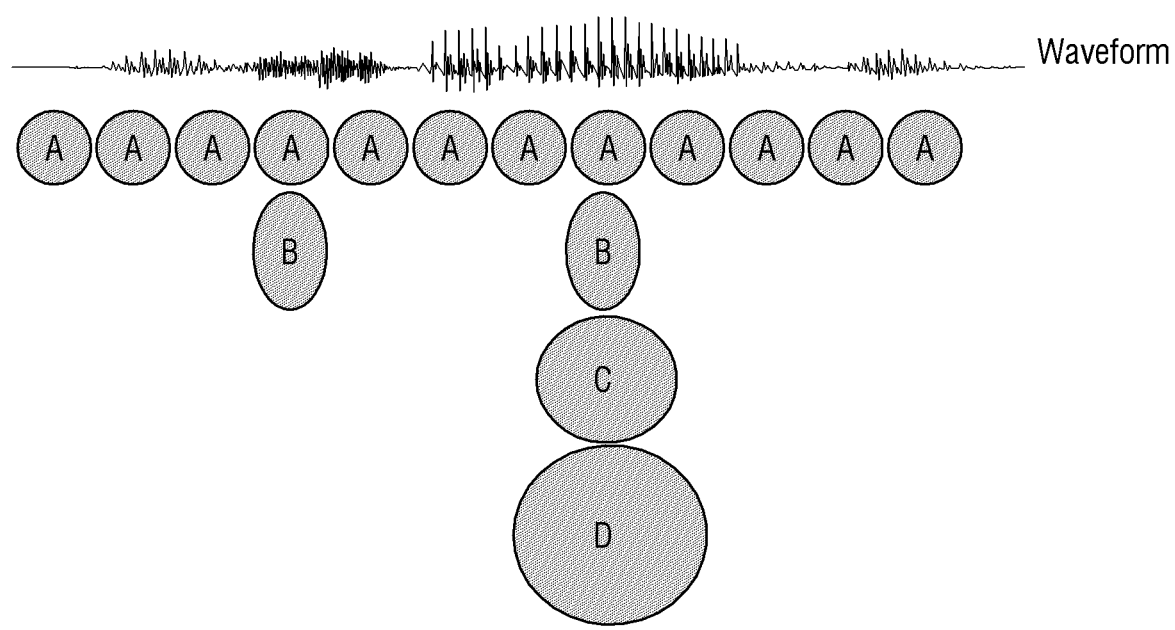
FIGS. 9A and 9B are views illustrating an arithmetic speed and energy consumption, according to an embodiment.
Figure 9B:
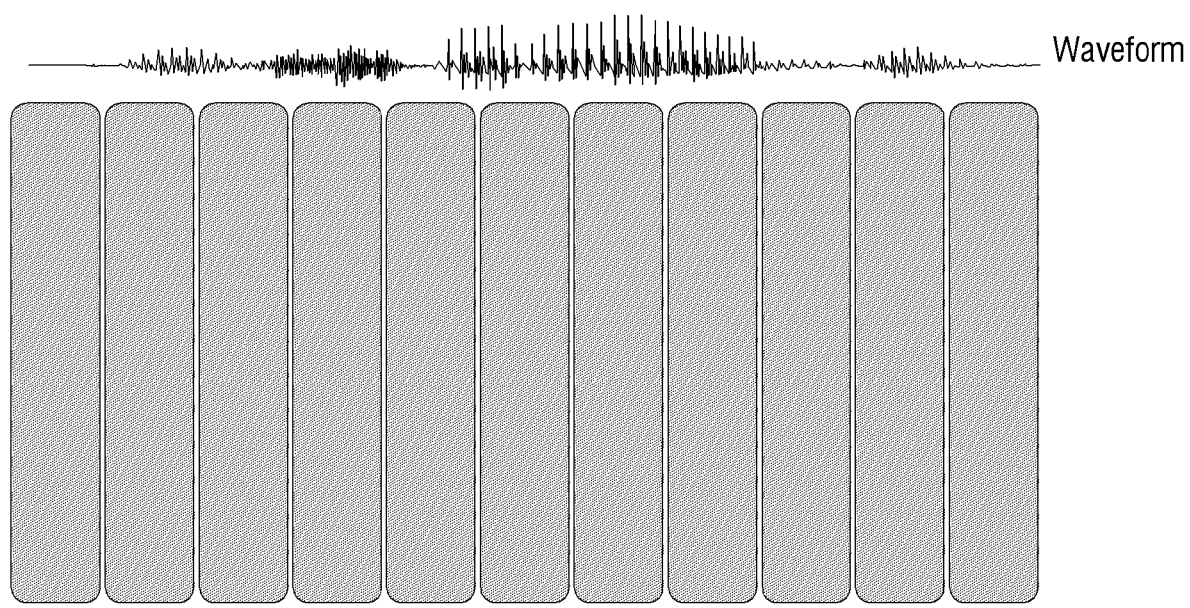

FIGS. 9A and 9B are views illustrating an arithmetic speed and energy consumption, according to an embodiment.

As described above, the processor 120 may use merely some of a first AI model not the entire AI model, thereby improving an arithmetic speed. As shown in FIG. 9A, the first AI model may be A+B+C+D, and the processor 120 may perform an arithmetic operation by using AI model A having the smallest number of bits. Also, if an arithmetic result acquired by the AI model A is determined as being inaccurate, the processor 120 may additionally use AI model B.

In other words, output data of most of input data may be acquired by using merely the AI model A as shown in FIG. 9A, and more improved performances may have in an arithmetic speed and energy consumption than if using all of the first AI model for all input data as shown in FIG. 9B.

Figure 10A:
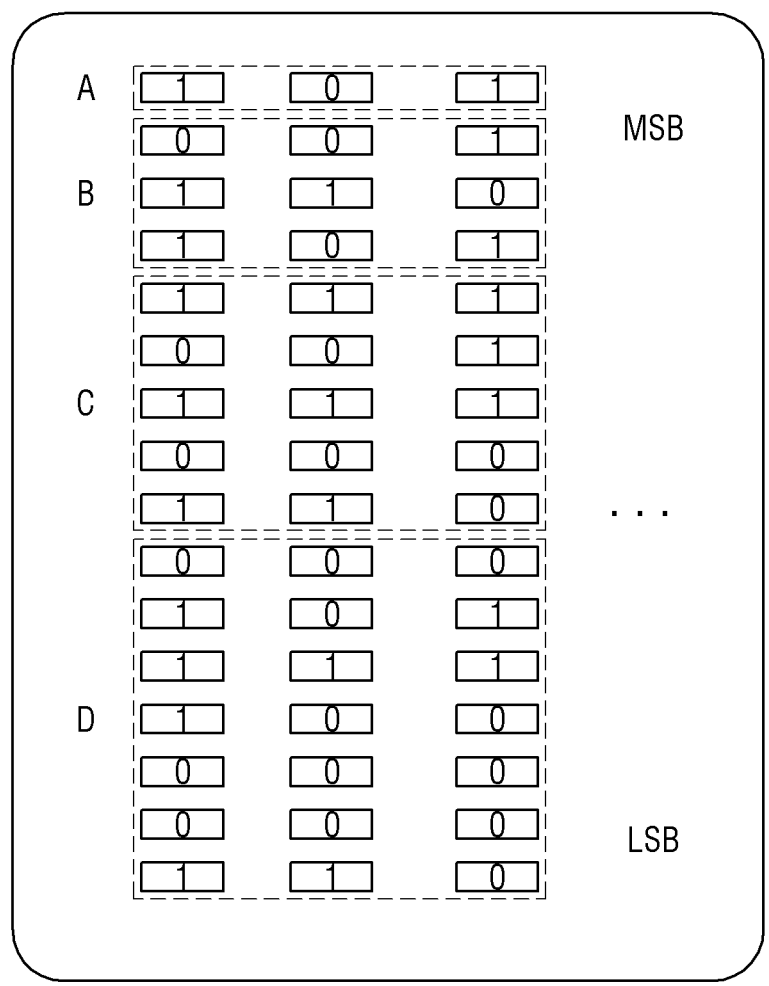
FIGS. 10A through 10C are views illustrating a method of classifying an AI model which will be stored in a second memory, according to embodiments.
Figure 10B:
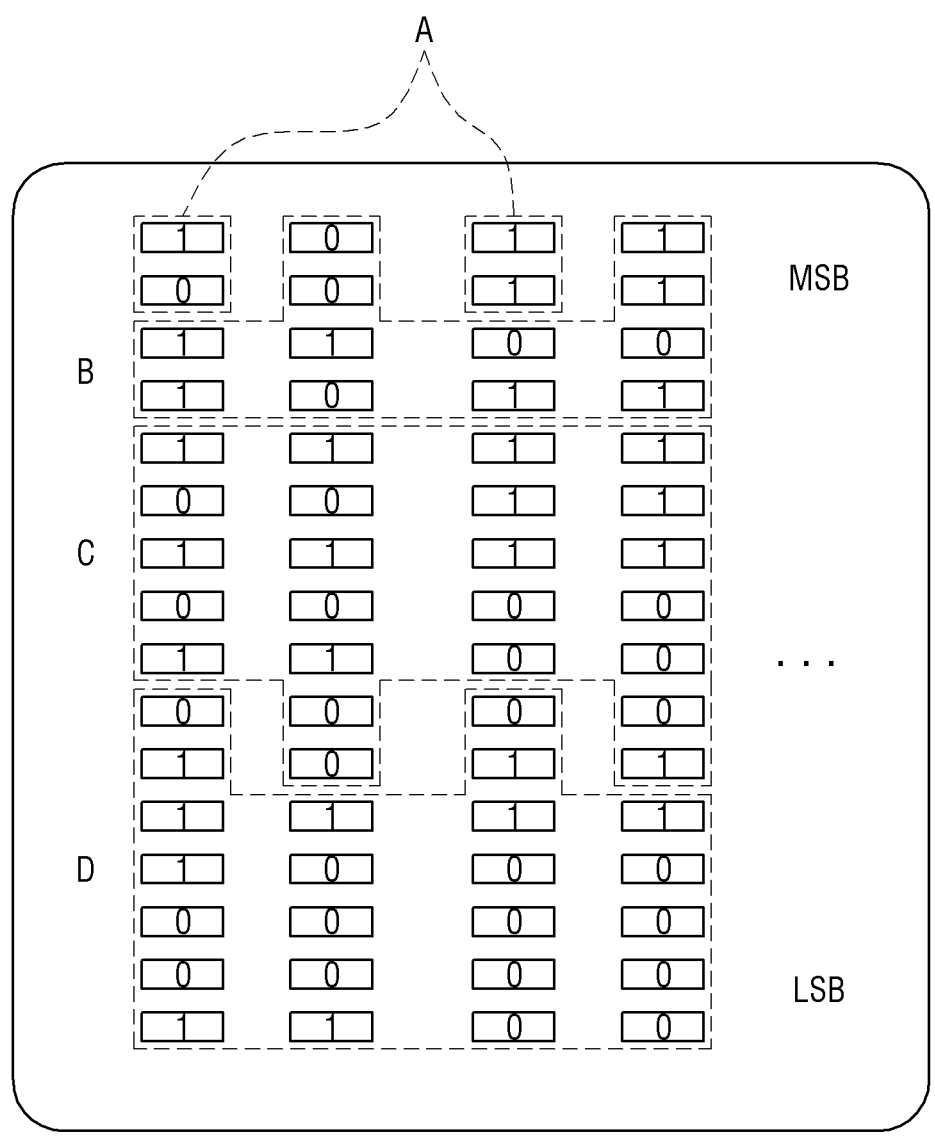
Figure 10C:
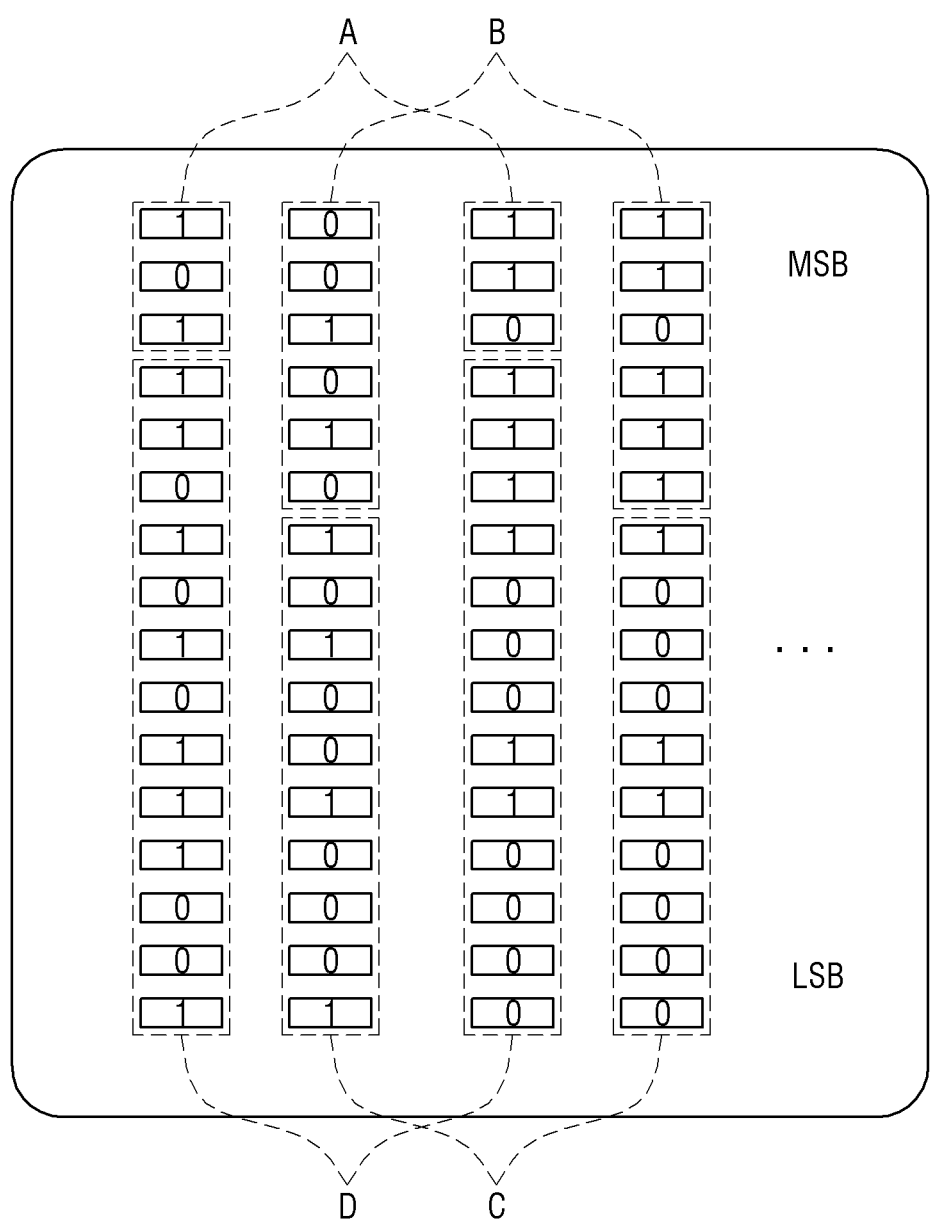

FIGS. 10A through 10C are views illustrating a method of classifying an AI model stored in the second memory 125, according to exemplary embodiments.

As described above, according to an exemplary embodiment, the numbers of bits of a plurality of elements included in each group are the same. For example, as shown in FIG. 10A, each of a plurality of first elements of group A may include higher 1 bit, each of a plurality of first elements of group B may include higher second through fourth bits, each of a plurality of first elements of group C may include higher fifth through ninth bits, and each of a plurality of first elements of group D may include higher tenth through other bits (sixteenth bit).

However, the disclosure is not limited thereto, the numbers of bits of a plurality of first elements respectively included in groups may be different from one another as shown in FIG. 10B such that some first elements of group A may not include any bits and other elements of group A may include higher 2 bits. Accordingly, some of the first elements of group B may include higher 4 bits while others may include only higher third and fourth bits, as shown in FIG. 10B. Alternatively, as shown in FIG. 10C, merely some of a plurality of first elements may be included in group A and may not be included in other groups.

Figure 11:
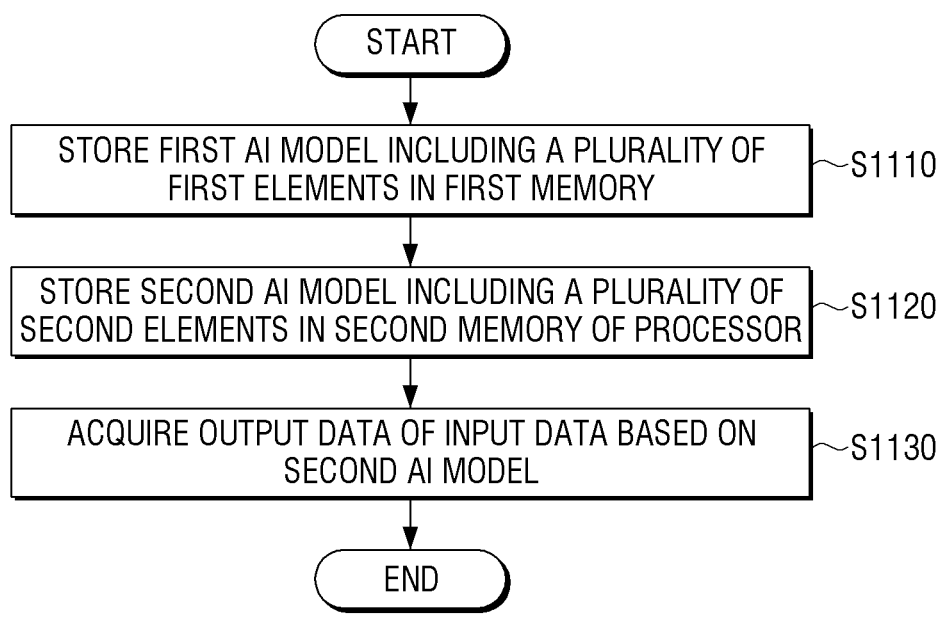
FIG. 11 is a flowchart illustrating a method of controlling an electronic apparatus, according to an embodiment.

FIG. 11 is a flowchart illustrating a method of controlling an electronic apparatus, according to an embodiment.

In operation S1110, a first AI model including a plurality of first elements is stored in a first memory of an electronic apparatus. In operation S1120, a second AI model including a plurality of second elements is stored in a second memory of a processor of the electronic apparatus. In operation S1130, output data of input data is acquired based on the second AI model. Here, the first AI model may be trained through an AI algorithm, and each of the plurality of second elements may include at least one higher bit of a plurality of bits included in each of the plurality of first elements.

Here, operation S1130 may include acquiring a plurality of first output elements by applying the input data to the second AI model and acquiring one of the plurality of first output elements as output data based on sizes of the plurality of first output elements.

Also, the acquiring of the one of the plurality of first output elements as the output data may include, if a difference between the first output element having a first largest size and the first output element having a second largest size among the plurality of first output elements is larger than or equal to a preset size, acquiring the first output element having the first largest size as the output data.

Alternatively, the method may further include storing a third AI model including a plurality of third elements in the second memory, if the difference between the first output elements is smaller than the preset size, storing the plurality of first output elements in the second memory, acquiring a plurality of first middle elements by applying the input data to the third AI model, acquiring a plurality of second output elements based on the first output elements and the first middle elements, and acquiring one of the plurality of second output elements as the output data based on sizes of the plurality of second output elements. Each of the plurality of third elements may include at least one higher bit of a plurality of bits included in each of the plurality of first elements except for at least one bit included in each of the plurality of second elements.

The acquiring of the one of the plurality of second output elements as the output data may include, if a difference between the second output element having a first largest size and the second output element having a second largest size among the plurality of second output elements is larger than or equal to a preset size, acquiring the second output element having the first largest size as the output data.

Here, the acquiring of the one of the plurality of second output elements as the output data may further include, if the difference between the second output elements is smaller than the preset size, storing the plurality of second output elements in the second memory, acquiring others of the plurality of first elements, excluding the plurality of second elements and the plurality of third elements, from the first memory, acquiring a plurality of second middle elements by performing an arithmetic operation on the acquired other first elements and the input data, acquiring a plurality of third output elements based on the second output elements and the second middle elements, and acquiring the third output element having a first largest size among the plurality of third output elements as the output data.

The acquiring of the one of the plurality of second output as the output data may include acquiring one of the plurality of second output elements as the output data based on at least one selected from among a size, a gradient, a moving average, and softmax of each of the plurality of second output elements.

Operation S1130 may include applying the input data to the second AI model through at least one multiplying operation.

According to embodiments described above, a processor of an electronic apparatus may include an internal memory which stores a compressed AI model, improves an arithmetic speed by performing an arithmetic operation by using the compressed AI model, and improves energy efficiency by minimizing a data transmission with an external memory which stores an AI model.

A difference between an output element having a first largest size and an output element having a second largest size among a plurality of output elements is compared with a preset size, as described above, but the preset size may vary in each operation. In the above-described embodiment, the processor 120 may compare a difference between a first output element having a first largest size and a first output element having a second largest size among a plurality of first output elements with a preset first size and compare a difference between a second output element having a first largest size and a second output element having a second largest size among a plurality of second output elements with a preset second size.

Even in a Long-Short Term Memory (LSTM) type, output data may be acquired by using merely some bits of a plurality of elements included in an AI model as described above. In this case, in each operation of the LSTM type, an arithmetic speed may be improved, and energy consumption may be reduced.

Embodiments may be embodied as software including instructions stored in machine-readable storage media (e.g., computer-readable storage media). A device may an apparatus that calls an instruction from a storage medium, may operate according to the called instruction, and may include an electronic device (e.g., an electronic device A) according to embodiments. If the instruction is executed by a processor, the processor may directly perform a function corresponding to the instruction or the function may be performed by using other types of elements under control of the processor. The instruction may contain a code made by a compiler or a code executable by an interpreter. The machine-readable storage medium may be provided as a non-transitory storage medium type. Here, "non-transitory" means that a storage medium does not include a signal and is tangible but does not distinguish semi-permanent and temporary storages of data in the storage medium.

Also, according to an embodiment, a method may be included and provided in a computer program product. The computer program product may be transacted as a product between a seller and a buyer. The computer program product may be distributed as a type of a machine-readable storage medium (e.g., a type of a compact disc read only memory (CD-ROM)) or may be distributed online through an application store (e.g., Play Store™). If the computer program product is distributed online, at least a part of the computer program product may be at least temporally or temporarily generated in a storage medium such as a memory of a server of a manufacturer, a server of an application store, or a relay server.

In addition, according to an embodiment, embodiments described above may be embodied in a recording medium readable by a computer or a similar apparatus to the computer by using software, hardware, or a combination thereof. In some cases, embodiments described herein may be embodied as a processor. According to a software embodiment, embodiments such as processes and functions described herein may be embodied as additional software modules. The software modules may perform at least one or more functions and operations described herein.

Computer instructions for performing a processing operation of a device according to the above-described embodiments may be stored in a non-transitory computer-readable medium. The computer instructions stored in the non-transitory computer-readable medium enable a particular device to perform a processing operation in a device according to the above-described embodiments when being executed by a processor of the particular device. The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

Each of elements according to the embodiments (e.g., modules or programs) may include a single entity or a plurality of entities, and some of corresponding sub elements described above may be omitted or other types of sub elements may be further included in embodiments. Alternatively or additionally, some elements (e.g., modules or programs) may be integrated into one entity and then may equally or similarly perform a function performed by each of corresponding elements that are not integrated. Operations performed by modules, programs, or other types of elements according to embodiments may be sequentially, in parallel, repeatedly, or heuristically executed or at least some operations may be executed in different sequences or may be omitted, or other types of operations may be added.

The foregoing embodiments and advantages are merely exemplary and are not to be construed as limiting the disclosure. The present teaching can be readily applied to other types of apparatuses. Also, the description of the embodiments is intended to be illustrative, and not to limit the scope of the claims, and many alternatives, modifications, and variations will be apparent to those skilled in the art.

What is claimed is:

1. An electronic apparatus comprising:
a first memory configured to store a first artificial intelligence (AI) model comprising a plurality of first elements, each of the plurality of first elements comprising a plurality of bits; and
a processor comprising a second memory that is configured to store a second AI model comprising a plurality of second elements and a third AI model comprising a plurality of third elements, and the processor is configured to acquire output data from input data based on the second AI model or the third AI model,
wherein the processor is configured to form the second AI model based on the first AI model and form the third AI model based on the first AI model,
wherein the first AI model is trained through an AI algorithm,
wherein each of the plurality of second elements comprises at least one higher bit of the plurality of bits of a respective element from among the plurality of first elements,
wherein the at least one higher bit indicates a bit in a bit position having a highest value among the plurality of bits or a preset number of consecutive bits from the bit position having the highest value among the plurality of bits,
wherein the processor is further configured to:
acquire a plurality of first output elements by applying the input data to the second AI model,
based on a difference between a first output element having a first largest size among the plurality of first output elements and another first output element having a second largest size among the plurality of first output elements being larger than or equal to a preset size, acquire the first output element having the first largest size among the plurality of first output elements as the output data, and
based on the difference between the first output element and the another first output element being smaller than the preset size, store the plurality of first output elements in the second memory, acquire a plurality of first middle elements by applying the input data to the third AI model, acquire a plurality of second output elements based on the plurality of first output elements and the plurality of first middle elements, and acquire one of the plurality of second output elements as the output data based on sizes of the plurality of second output elements, and
wherein each of the plurality of third elements comprises at least one higher bit of the plurality of bits in each of the plurality of first elements except for the at least one bit comprised in each of the plurality of second elements, and
wherein an accuracy of acquiring the output data by the third AI model is lower than an accuracy of acquiring the output data by the first AI model and higher than an accuracy of acquiring the output data by the second AI model.

2. The electronic apparatus of claim 1, wherein, based on a difference between a second output element having a first largest size among the plurality of second output elements and another second output element having a second largest size among the plurality of second output elements being larger than or equal to the preset size, the processor is further configured to acquire the second output element having the first largest size as the output data.

3. The electronic apparatus of claim 2, wherein, based on the difference between the second output element and the another second output element being smaller than the preset size, the second memory is configured to store the plurality of second output elements, and the processor is further configured to acquire others of the plurality of first elements, excluding the plurality of second elements and the plurality of third elements, from the first memory, acquire a plurality of second middle elements by performing an arithmetic operation on the acquired others of the plurality of first elements and the input data, acquire a plurality of third output elements based on the plurality of second output elements and the plurality of second middle elements, and acquire a third output element having a largest size among the plurality of third output elements as the output data.

4. The electronic apparatus of claim 1, wherein the processor is further configured to acquire one of the plurality of second output elements as the output data based on at least one selected from among a size, a gradient, a moving average, and softmax of each of the plurality of second output elements.

5. The electronic apparatus of claim 1, wherein the processor comprises at least one multiplier configured to apply the input data to the second AI model.

6. The electronic apparatus of claim 5, wherein the at least one multiplier comprises:
- a shifter configured to receive an element of a plurality of elements comprised in the input data, shift and output the received element according to a cycle;
- a First-In First-Out (FIFO) memory configured to receive the second element of the plurality of second elements corresponding to the element received by the shifter and output at least one bit of the received second element according to the cycle; and
- an accumulator configured to receive and accumulate a result of an arithmetic operation performed on the received element output from the shifter and the second element output from the FIFO memory according to the cycle.

7. A method of controlling an electronic apparatus, the method comprising:
- storing, in a first memory, a first artificial intelligence (AI) model comprising a plurality of first elements, wherein each of the plurality of first elements comprises a plurality of bits;
- storing, in a second memory of a processor, a second AI model comprising a plurality of second elements and a third AI model comprising a plurality of third elements; and
- acquiring, by the processor, output data from input data based on the second AI model or the third AI model,
- wherein the second AI model is formed based on the first AI model, and the third AI model is formed based on the first AI model,
- wherein the first AI model is trained through an AI algorithm,
- wherein each of the plurality of second elements comprises at least one higher bit of the plurality of bits comprised in a respective element from among the plurality of first elements,
- wherein the at least one higher bit indicates a bit in a bit position having a highest value among the plurality of bits or a preset number of consecutive bits from the bit position having the highest value among the plurality of bits,
- wherein the acquiring comprises:
- acquiring a plurality of first output elements by applying the input data to the second AI model;
- based on a difference between a first output element having a first largest size among the plurality of first output elements and another first output element having a second largest size among the plurality of first output elements being larger than or equal to a preset size, acquiring the first output element having the first largest size among the plurality of first output elements as the output data; and
- based on the difference between the first output element and the another first output element being smaller than the preset size, storing the plurality of first output elements in the second memory, acquiring, by the processor, a plurality of first middle elements by applying the input data to the third AI model, acquiring, by the processor, a plurality of second output elements based on the first output elements and the first middle elements and acquiring one of the plurality of second output elements as the output data based on sizes of the plurality of second output elements,
- wherein each of the plurality of third elements comprises at least one higher bit of the plurality of bits in the respective element from among the plurality of first elements except for at least one bit of a respective second element from among the plurality of second elements, and
- wherein an accuracy of acquiring the output data by the third AI model is lower than an accuracy of acquiring the output data by the first AI model and higher than an accuracy of acquiring the output data by the second AI model.

8. The method of claim 7, wherein the acquiring of the one of the plurality of second output elements as the output data comprises:
- based on a difference between a second output element having a first largest size among the plurality of second output elements and another second output element having a second largest size among the plurality of second output elements being larger than or equal to the preset size, acquiring the second output element having the first largest size as the output data.

9. The method of claim 8, further comprising:
- based on the difference between the second output element and the another second output element being smaller than the preset size, storing, in the second memory, the plurality of second output elements;
- acquiring, from the first memory, others of the plurality of first elements, excluding the plurality of second elements and the plurality of third elements;
- acquiring a plurality of second middle elements by performing an arithmetic operation on the acquired other first elements and the input data;
- acquiring a plurality of third output elements based on the second output elements and the plurality of second middle elements; and
- acquiring a third output element having a first largest size among the plurality of third output elements as the output data.

10. The method of claim 7, wherein the acquiring the one of the plurality of second output elements as the output data comprises acquiring the one of the plurality of second output elements as the output data based on at least one selected from among a size, a gradient, a moving average, and softmax of each of the plurality of second output elements.

11. The method of claim 7, wherein the acquiring comprises applying the input data to the second AI model through at least one multiplying operation.

12. A non-transitory computer readable medium storing computer-readable instructions for performing an operation method of an electronic apparatus, the operation method comprising:
- storing, in a first memory, a first artificial intelligence (AI) model comprising a plurality of first elements, wherein each of the plurality of first elements comprises a plurality of bits;
- storing, in a second memory of a processor of the electronic apparatus, a second AI model comprising a plurality of second elements and a third AI model comprising a plurality of third elements; and
- acquiring output data from input data based on the second AI model or the third AI model,
- wherein the second AI model is formed based on the first AI model, and the third AI model is formed based on the first AI model,
- wherein the first AI model is trained through an AI algorithm,
- wherein each of the plurality of second elements comprises at least one higher bit of the plurality of bits of a respective element from among the plurality of first elements, wherein the at least one higher bit indicates a bit in a bit position having a highest value among the plurality of bits or a preset number of consecutive bits from the bit position having the highest value among the plurality of bits, wherein the acquiring comprises:

acquiring a plurality of first output elements by applying the input data to the second AI model;

based on a difference between a first output element having a first largest size among the plurality of first output elements and another first output element having a second largest size among the plurality of first output elements being larger than or equal to a preset size, acquiring the first output element having the first largest size among the plurality of first output elements as the output data; and based on the difference between the first output element and the another first output element being smaller than the preset size, storing the plurality of first output elements in the second memory, acquiring a plurality of first middle elements by applying the input data to the third AI model, acquiring a plurality of second output elements based on the first output elements and the first middle elements and acquiring one of the plurality of second output elements as the output data based on sizes of the plurality of second output elements, wherein each of the plurality of third elements comprises at least one higher bit of the plurality of bits in the respective element from among the plurality of first elements except for at least one bit of a respective second element from among the plurality of second elements, and wherein an accuracy of acquiring the output data by the third AI model is lower than an accuracy of acquiring the output data by the first AI model and higher than an accuracy of acquiring the output data by the second AI model.

13. The electronic apparatus of claim 1, wherein each of the plurality of first elements has first bits, each of the plurality of second elements has second bits and each of the plurality of third elements has third bits, where a number of the first bits is larger than a number of the second bits, and the number of the first bits is larger than a number of the third bits, wherein the input data includes a set of data, and wherein the processor is further configured to acquire the plurality of first output elements by applying the set of data in the input data to the second AI model, and acquire the plurality of first middle elements by applying the same set of data in the input data to the third AI model.

14. The method of claim 7, wherein each of the plurality of first elements has first bits, each of the plurality of second elements has second bits and each of the plurality of third elements has third bits, where a number of the first bits is larger than a number of the second bits, and the number of the first bits is larger than the number of the third bits, wherein the input data includes a set of data, and wherein the acquiring of the plurality of first output elements comprises acquiring the plurality of first output elements by applying the set of data in the input data to the second AI model, and the acquiring of the plurality of first middle elements comprises acquiring the plurality of first middle elements by applying the same set of data in the input data to the third AI model.

* * * * *